United States Patent
Wei et al.

(10) Patent No.: US 9,269,161 B2
(45) Date of Patent: Feb. 23, 2016

(54) ANTI-COUNTERFEITING TEST METHOD, DEVICE AND SYSTEM BASED ON TEXTURES

(71) Applicant: SINOSUN TECHNOLOGY CO., LTD., Shenzhen (CN)

(72) Inventors: Kaiyan Wei, Shenzhen (CN); Lanping Yuan, Shenzhen (CN); Chun Qiao, Shenzhen (CN)

(73) Assignee: SINOSUN TECHNOLOGY CO., LTD., Shenzhen (CN)

( * ) Notice: Subject to any disclaimer, the term of this patent is extended or adjusted under 35 U.S.C. 154(b) by 215 days.

(21) Appl. No.: 13/924,946

(22) Filed: Jun. 24, 2013

(65) Prior Publication Data

US 2013/0287263 A1    Oct. 31, 2013

Related U.S. Application Data

(63) Continuation of application No. PCT/CN2011/082140, filed on Nov. 14, 2011.

(30) Foreign Application Priority Data

Dec. 24, 2010 (CN) .......................... 2010 1 0604824
Aug. 21, 2011 (CN) .......................... 2011 1 0239817
Sep. 7, 2011 (CN) .......................... 2011 1 0263771

(51) Int. Cl.
*G06K 9/00* (2006.01)
*G06T 7/40* (2006.01)
*G07D 7/20* (2006.01)

(52) U.S. Cl.
CPC .............. *G06T 7/40* (2013.01); *G06K 9/00147* (2013.01); *G06K 9/00577* (2013.01); *G07D 7/2041* (2013.01)

(58) Field of Classification Search
CPC .. G06T 7/40; G06K 9/00147; G06K 9/00577; G07D 7/2041
See application file for complete search history.

(56) References Cited

U.S. PATENT DOCUMENTS 5,974,150 A * 10/1999 Kaish .................. G06K 19/086
                                                       283/85
6,928,552 B1 * 8/2005 Mischenko et al. ............ 726/22
(Continued)

FOREIGN PATENT DOCUMENTS

| CN | 1430175 | 7/2003 |
|---|---|---|
| CN | 101748659 | 6/2010 |
| CN | 102073865 | 5/2011 |

*Primary Examiner* — Tom Y Lu
(74) *Attorney, Agent, or Firm* — Hamre, Schumann, Mueller & Larson, P.C.

(57) ABSTRACT

The present invention relates to anti-counterfeiting field, and more particularly, to an anti-counterfeiting method, device and system based on textures of an object to be tested. The method includes: providing a light source based on a pre-determined anti-counterfeiting test model, projecting light emitted by the light source on a pre-determined test area, obtaining a pre-determined number of pictures of the pre-determined test area by means of a pre-determined optical sensor, acquiring texture characteristics of the pre-determined test area from the pictures, computing similarity between the texture characteristics and pre-stored texture characteristics and outputting a test result based on the similarity. The present invention implements anti-counterfeiting function by using the texture characteristics of the object itself and improves the anti-counterfeiting level greatly without increasing complexity of the production of the object.

16 Claims, 8 Drawing Sheets

(56) References Cited

U.S. PATENT DOCUMENTS 7,194,105 B2 * 3/2007 Hersch et al. ............... 382/100
2007/0122022 A1 * 5/2007 Shimizu et al. ............... 382/135
2012/0183180 A1 * 7/2012 Sun ............................... 382/108

* cited by examiner

ANTI-COUNTERFEITING TEST METHOD, DEVICE AND SYSTEM BASED ON TEXTURES

BACKGROUND OF THE INVENTION

1. Technical Field

The present invention relates to anti-counterfeiting field, and more particularly, to an anti-counterfeiting test method, device and system based on textures.

2. Description of Related Art

The objective of anti-counterfeiting technology is to provide prevention measures to prevent imitation and copy without an owner's allowance. There are many kinds of existing anti-counterfeiting technologies, such as the anti-counterfeiting technologies using printing, chemical material and physical characteristics, digital information, structure and packaging, human body biologic characteristics.

The anti-counterfeiting technologies can be applied to anti-counterfeiting paper and bill, which is one of the important applications of the anti-counterfeiting technologies. However, it is obvious that most of the anti-counterfeiting technologies used for the anti-counterfeiting paper and bill need additional material such as safety lines and fluorescent fibers. It can be seen that a complex process is required for the production of the anti-counterfeiting paper and bill. On one hand, since anti-counterfeiting characteristics are added artificially into the anti-counterfeiting paper or bill, so that other persons may also counterfeit the characteristics and the counterfeiting possibility will be increased at some degree. On the other hand, since the addition of anti-counterfeiting characteristics requires to improve conventional paper-making process, which will increase the complexity and the cost of paper making, and thereby increase the complexity and cost of the anti-counterfeit at some degree.

BRIEF SUMMARY OF THE INVENTION

A technical problem to be solved by the present invention is to overcome the shortcomings of the prior art and provide an anti-counterfeiting test method, device and system based on textures.

The present invention adopts the following technical solutions to solve the technical problem:

At the first aspect, an anti-counterfeiting test method based on textures is provided according to the embodiment of the present invention, including:

providing a light source based on a pre-determined anti-counterfeiting test model wherein the pre-determined anti-counterfeiting test model is a light transmittance anti-counterfeiting test model or a light reflex anti-counterfeiting test model;

projecting light emitted by the light source on a pre-determined test area of an object to be tested;

obtaining a pre-determined number of pictures of the pre-determined test area by means of a pre-determined optical sensor based on the pre-determined anti-counterfeiting test model;

acquiring texture characteristics of the pre-determined test area from the pictures;

computing similarity between the texture characteristics and pre-stored texture characteristics and outputting a test result based on the similarity.

At the second aspect, an anti-counterfeiting test device based on textures is provided according to the embodiment of the present invention, including:

a light source providing unit configured for providing a light source based on a pre-determined anti-counterfeiting test model wherein the pre-determined anti-counterfeiting test model is a light transmittance anti-counterfeiting test model or a light reflex anti-counterfeiting test model;

a light projecting unit configured for projecting light emitted by the light source on a pre-determined test area of an object to be tested;

a picture obtaining unit configured for obtaining a pre-determined number of pictures of the pre-determined test area by means of a pre-determined optical sensor based on the pre-determined anti-counterfeiting test model;

a texture characteristic acquiring unit configured for acquiring texture characteristics of the pre-determined test area from the pictures; and a test result outputting unit configured for computing similarity between the texture characteristics and pre-stored texture characteristics and outputting a test result based on the similarity.

At the third aspect, an anti-counterfeiting test system based on textures is provided according to the embodiment of the present invention, including:

a light source configured for projecting light on a object to be tested;

a memory configured for storing the texture characteristics of the object;

a controller configured for controlling the light source to provide a type of light source based on a pre-determined anti-counterfeiting test model and controlling the type of light source to project light on a pre-determined test area of the object wherein the pre-determined anti-counterfeiting test model is a light transmittance anti-counterfeiting test model or a light reflex anti-counterfeiting test model;

an optical sensor configured for obtaining a pre-determined number of pictures of the pre-determined test area based on the pre-determined anti-counterfeiting test model; and a processor configured for acquiring texture characteristics of the pre-determined test area from the pictures obtained by the optical sensor, computing similarity between acquired texture characteristics and the texture characteristics stored in the memory, and outputting a test result based on the similarity.

The present invention has the following benefits: composite texture characteristics are obtained based on the texture of the object to be tested and the pre-determined anti-counterfeiting test model, thereby implementing a anti-counterfeiting function by means of the composite texture characteristics of the object itself, so that the anti-counterfeiting level are improved, at the same time, the anti-counterfeiting test and production of the object are simplified, which reduces the anti-counterfeiting cost of the object.

DETAILED DESCRIPTION OF THE INVENTION

In order to make clearer the objects, technical solutions and advantages of the invention, the present invention will be explained below in detail with reference to the accompanying drawings and embodiments. It is to be understood that the following description of the embodiments is merely to explain the present invention and is no way intended to limit the invention.

The following will describe the technical solutions presented in the invention by particular embodiments.

Figure 1:
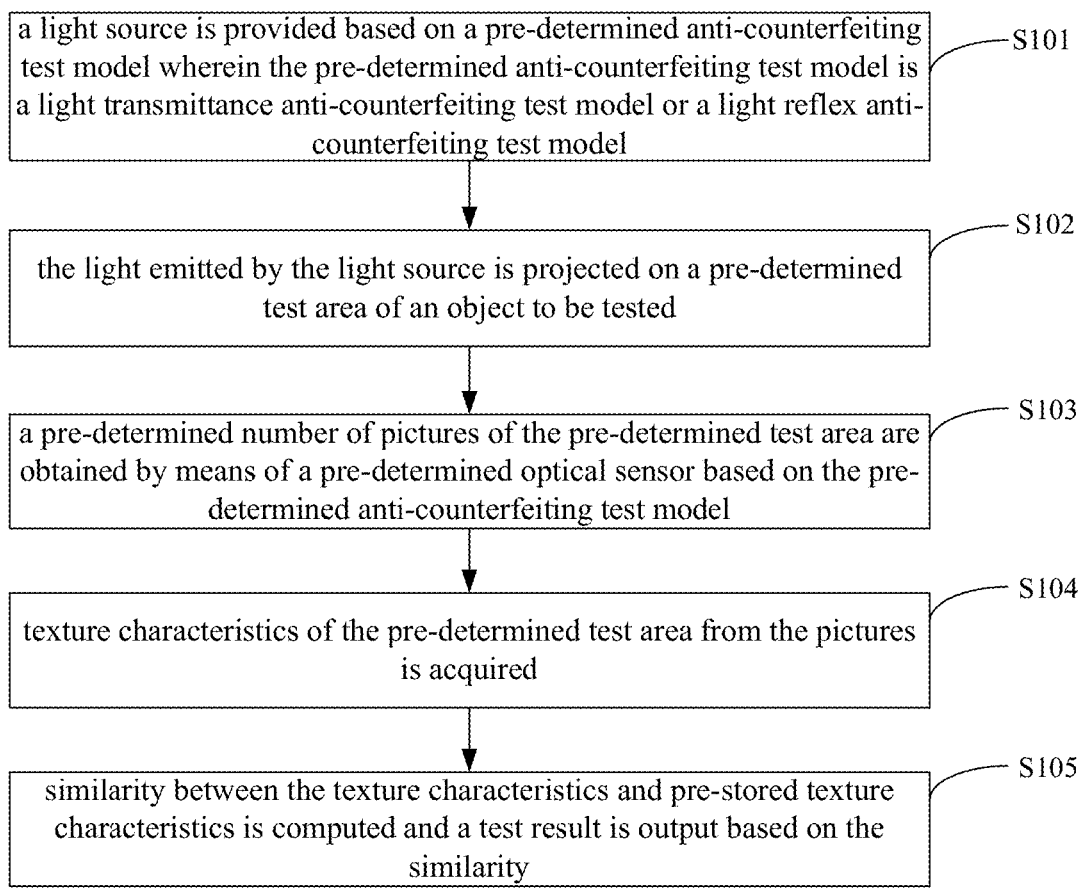
FIG. 1 is a flowchart of an anti-counterfeiting test method based on textures according to an embodiment of the present invention.

FIG. 1 illustrates a flowchart of an anti-counterfeiting test method based on textures according to an embodiment of the present invention.

At step 101, a light source is provided based on a pre-determined anti-counterfeiting test model wherein the pre-determined anti-counterfeiting test model is a light transmittance anti-counterfeiting test model or a light reflex anti-counterfeiting test model.

Generally, textures as an important characteristic of an object combines fiber distribution, trend and other fiber characteristics represented on a surface of an object. Take paper for example, the trend, bending and length information of paper fibers may be obtained from a texture picture of the paper. Since the distribution of the paper fibers is random, no two papers conventionally have the same distribution of paper fibers, so that the textures may be used as anti-counterfeiting characteristics of a piece of paper. However, the textures represented on the surface may be counterfeited, for example, by a high-accuracy printer. In this embodiment of the present invention, the anti-counterfeiting test method is presented based on the textures.

In this embodiment, firstly, an anti-counterfeiting test model of the object is set. A light source may be provided based on the set anti-counterfeiting test model wherein the pre-determined anti-counterfeiting test model is a light transmittance anti-counterfeiting test model or a light reflex anti-counterfeiting test model. Correspondingly, the light source can be a plane light source or a point light source. The anti-counterfeiting test process will be detailed in following embodiments.

At step 102, the light emitted by the light source is projected on a pre-determined test area of an object to be tested.

In this embodiment, if the pre-determined anti-counterfeiting test model is the light transmittance anti-counterfeiting test model, preferably, the object to be tested is paper or other light transmittable sheet objects.

In this embodiment, it is necessary to pre-determine a test area of the object in order to easily control the light source to project light on the test area.

At step 103, a pre-determined number of pictures of the pre-determined test area are obtained by means of a pre-determined optical sensor based on the pre-determined anti-counterfeiting test model.

In this embodiment, an optical sensor is preset for taking pictures of the test area so that texture pictures including textures of the object can be obtained. In particular, different anti-counterfeiting test models require different numbers of pictures, so that the number of taken pictures under each of anti-counterfeiting test models should be preset.

Since the textures of the object may be not clear under visual conditions, preferably, an optical amplifying device can be provided between the optical sensor and the pre-determined test area, so that the pre-determined test area may be optically amplified based on a magnification of the optical amplifying device in order to obtain more clear texture pictures. In particular, the magnification of the optical amplifying device may be a constant or settable, for example, the magnification may be set based on transparency of the object such that the magnification can be controlled flexibly to accommodate objects with different transparency. Preferably, the magnification of the optical amplifying device is two.

At step 104, texture characteristics of the pre-determined test area from the pictures is acquired.

In this embodiment, appropriate methods may be used for acquiring the texture characteristics of the textures of the pre-determined test area from the pictures, such as a Markov Random Field model, a wavelet transform model.

At step 105, similarity between the texture characteristics and pre-stored texture characteristics is computed and a test result is output based on the similarity.

In this embodiment, the texture characteristics are compared with pre-stored texture characteristics in order to obtain the similarity between thereof When the similarity is within a pre-determined range, a corresponding test result is output. For example, if the similarity ranges from 0.9 to 1.0, the test result that the object is genuine is output. Otherwise, the test result that the object is counterfeited is output. In particular, the pre-determined range may be set based on anti-counterfeiting level of application of the method. For example, the higher the anti-counterfeiting level of application of the method requires, the higher the similarity should be set.

In particular, a pattern recognition algorithm can be used to match the acquired texture characteristics with the pre-stored texture characteristics in order to obtain the similarity. The pattern recognition algorithm may be, for example, classical statistical analyses, local feature description (for example, SIFT or SURF) or SVM classer. The pre-stored texture characteristics may be stored in a memory of a test system, or in form of QR code or other coding forms.

The embodiment of the present invention provides a light source based on a pre-determined anti-counterfeiting test model, computes similarity between the acquired texture characteristics and pre-stored texture characteristics and outputs a test result based on the similarity, therefore, the anti-counterfeiting test and production of the object is simplified and the anti-counterfeiting cost of the object is reduced. Furthermore, more clear texture characteristics of the object can be got by means of providing an optical amplifying device between the optical sensor and the pre-determined test area, which extends application range of the method.

Figure 2:
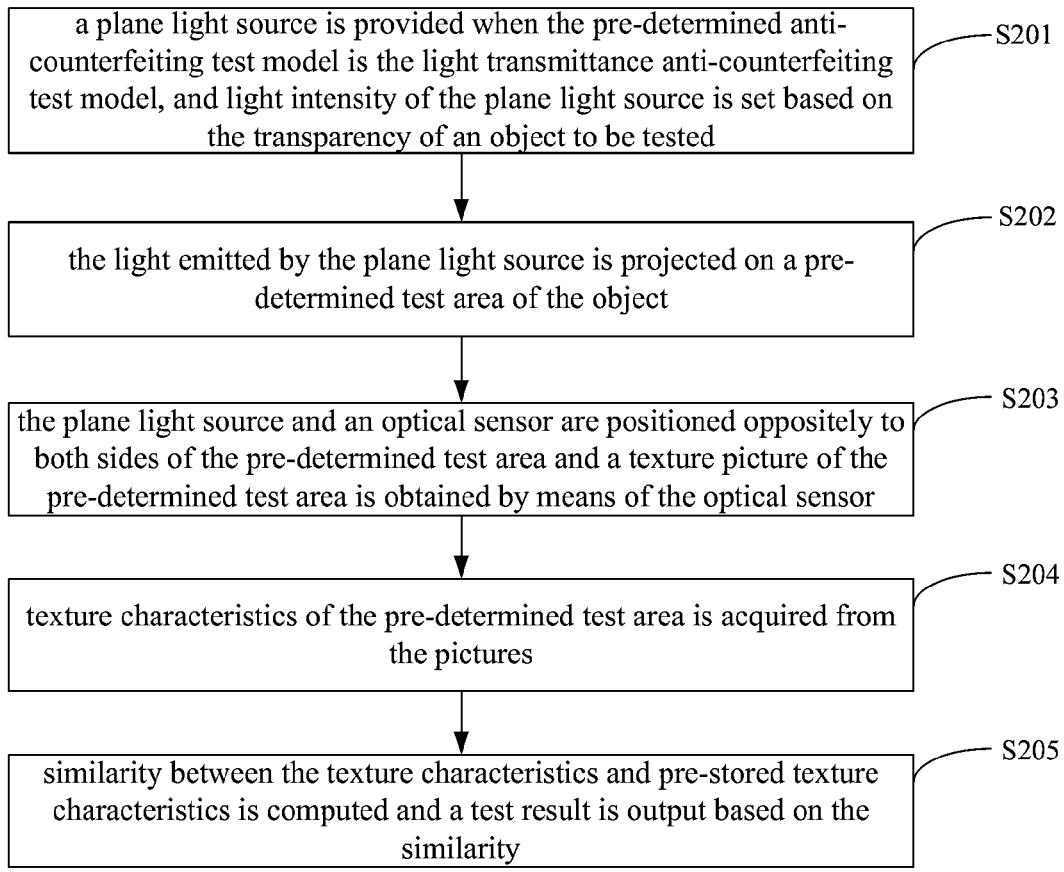
FIG. 2 is a flowchart of an anti-counterfeiting test method based on textures according to an embodiment of the present invention.

FIG. 2 illustrates a flowchart of an anti-counterfeiting test method based on textures if the pre-determined anti-counterfeiting test model is a light transmittance anti-counterfeiting test model according to an embodiment of the present invention.

In step 201, a plane light source is provided if the pre-determined anti-counterfeiting test model is the light transmittance anti-counterfeiting test model, and light intensity of the plane light source is set based on the transparency of an object to be tested.

In this embodiment, if the pre-determined anti-counterfeiting test model is the light transmittance anti-counterfeiting test model, a plane light source is provided so as to obtain uniform transmittance of light, the light intensity of the plane light source is set based on the transparency of a object to be tested so that the light intensity of the plane light source can be adjusted flexibly, and inner textures of the object can be taken by an optical sensor.

In step 202, the light emitted by the plane light source is projected on a pre-determined test area of the object.

In step 203, the plane light source and an optical sensor are positioned oppositely to both sides of the pre-determined test area and a texture picture of the pre-determined test area is obtained by means of the optical sensor.

In this embodiment, the plane light source and the optical sensor are positioned oppositely to both sides of the pre-determined test area, so that the optical sensor can clearly take a picture of the textures of the object within the pre-determined test area. In this embodiment of the present invention, the textures of the object within the pre-determined test area is composite textures that are formed by overlaying the inner textures of the object with the external textures of the object, so that even if the external textures/surface textures are counterfeited, it is difficult to counterfeit the inner textures and further to obtain the composite textures according to the embodiment of the present invention.

Figure 3:
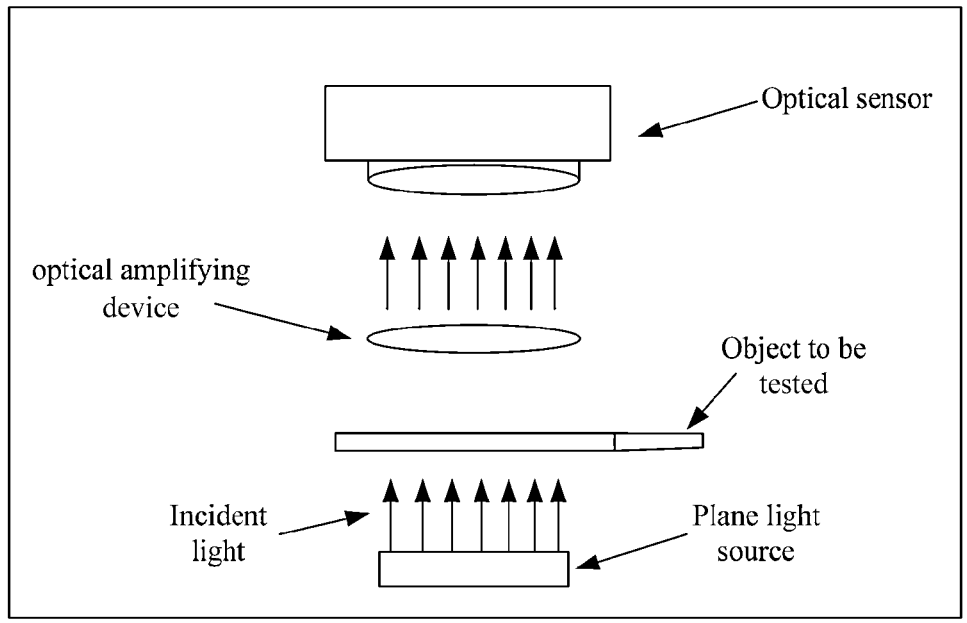
FIG. 3 is a flowchart of an anti-counterfeiting test method based on textures according to an embodiment of the present invention.
Figure 4:
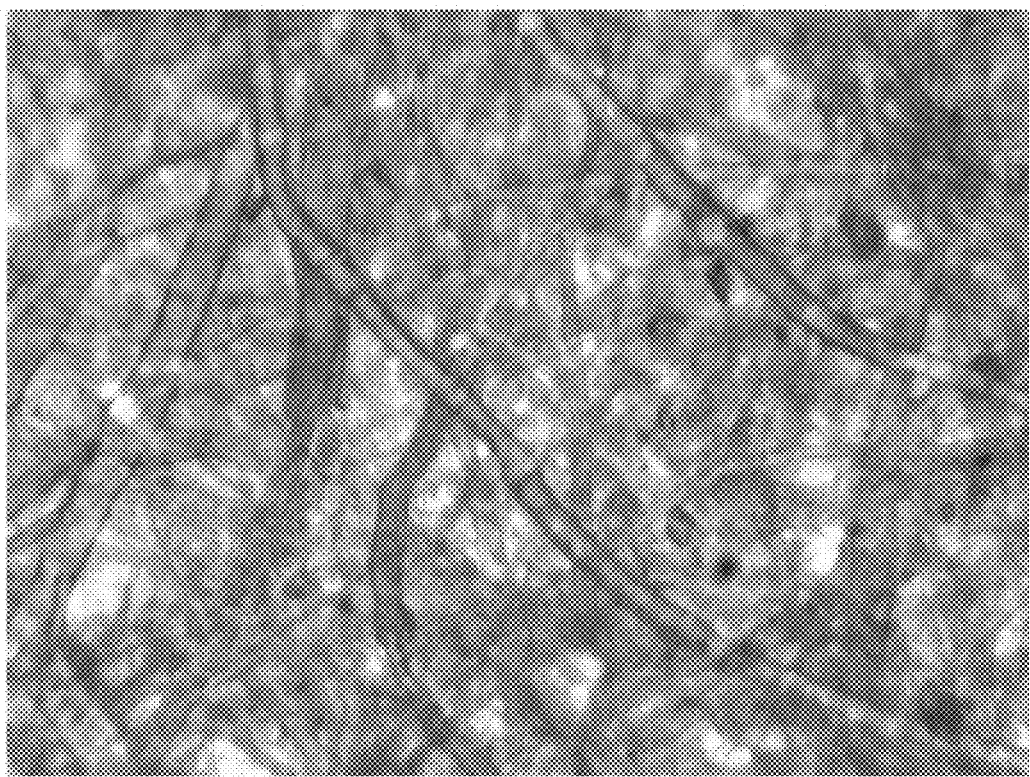
FIG. 4 is a schematic view of obtained textures when the pre-determined anti-counterfeiting test model is the light transmittance anti-counterfeiting test model.

As an example, FIG. 3 illustrates an obtaining process of a texture picture under a light transmittance anti-counterfeiting test model. In the figure, light is emitted by a plane light source and uniformly projected on a test area of an object to be tested. In order to obtain clear textures of the test area, preferably, an optical amplifying device is provided above the test area. Alternately, the optical amplifying device may be made as a part that is integrated with the optical sensor so that an anti-counterfeiting test system used for testing the object is simplified. Exemplarily, FIG. 4 shows a texture picture of an object obtained under the light transmittance anti-counterfeiting test model, the textures of the object in the figure is composite textures that are formed by overlaying the inner textures of the object with the external textures of the object.

In step 204, texture characteristics of the pre-determined test area is acquired from the pictures.

In this embodiment, as mentioned above, the texture picture of the object within the pre-determined test area represents composite textures that are formed by overlaying the inner textures of the object with the external textures of the object. Correspondingly, the texture characteristics of the pre-determined test area are the characteristics of the textures formed by overlaying the inner textures of the object with the external textures of the object.

In step 205, similarity between the texture characteristics and pre-stored texture characteristics is computed and a test result is output based on the similarity.

In this embodiment, the object is transmitted by uniform light and the clear texture characteristics of the test area then are acquired wherein the texture characteristics are the characteristics of the textures formed by overlaying the inner textures of the object with the external textures of the object within the test area. Since the inner textures of the object are almost impossible to counterfeit, the anti-counterfeiting effect are improved greatly.

Figure 5:
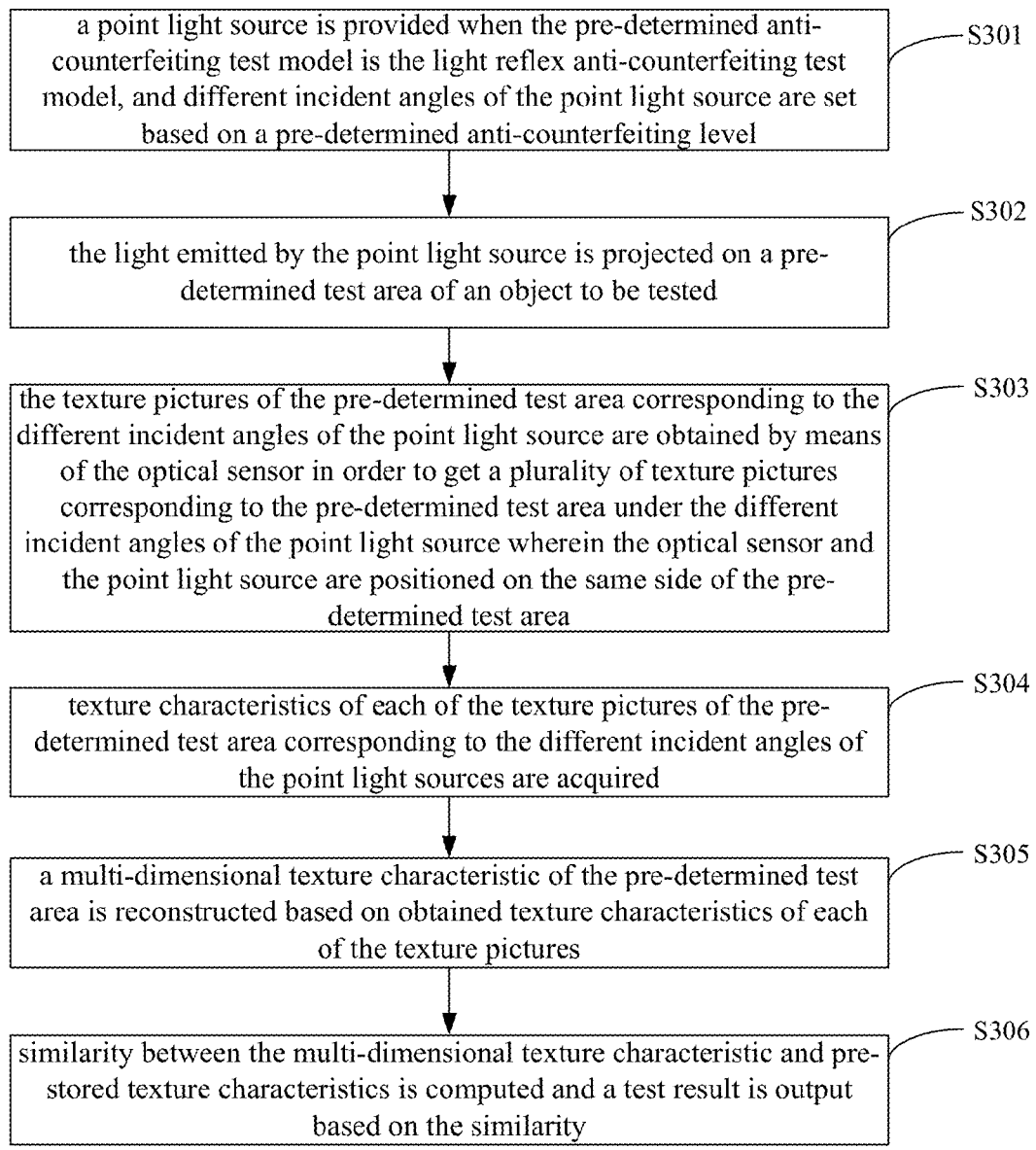
FIG. 5 is a flowchart of an anti-counterfeiting test method based on textures according to an embodiment of the present invention.

FIG. 5 illustrates a flowchart of an anti-counterfeiting test method based on textures if the pre-determined anti-counterfeiting test model is a light reflex anti-counterfeiting test model according to an embodiment of the present invention.

In step 301, a point light source is provided if the pre-determined anti-counterfeiting test model is the light reflex anti-counterfeiting test model, and different incident angles of the point light source are set based on a pre-determined anti-counterfeiting level.

It is well known that when light with different incident angles is projected to an area, the direction of the light reflected by the area will be different, the textures represented by the area corresponding to the light with different incident angles are also different. According to the embodiment of the present embodiment, in order to obtain a higher anti-counterfeiting level, the light with different incident angles can be projected to the test area, so that different texture pictures of the test area can be obtained.

In this embodiment, when the pre-determined anti-counterfeiting test model is a light reflex anti-counterfeiting test model, a point light source is provided, and different incident angles of the point light source are set based on a pre-determined anti-counterfeiting level. The higher the anti-counterfeiting level is, the more incident angles the point light source need, so that different texture pictures of the test area can be obtained when light with a plurality of incident angles is projected on the test area. In particular, the light with a plurality of incident angles may be obtained by means of providing the plurality of fixed point light sources. Alternately, the light with a plurality of incident angles may be obtained by means of one point light source. The one point light source can be controlled to move to corresponding positions so that the light with a plurality of incident angles may be obtained.

In step 302, the light emitted by the point light source is projected on a pre-determined test area of an object to be tested.

In step 303, the texture pictures of the pre-determined test area corresponding to the different incident angles of the point light source are obtained by means of the optical sensor in order to get a plurality of texture pictures corresponding to the pre-determined test area under the different incident angles of the point light source wherein the optical sensor and the point light source are positioned on the same side of the pre-determined test area.

Figure 6:
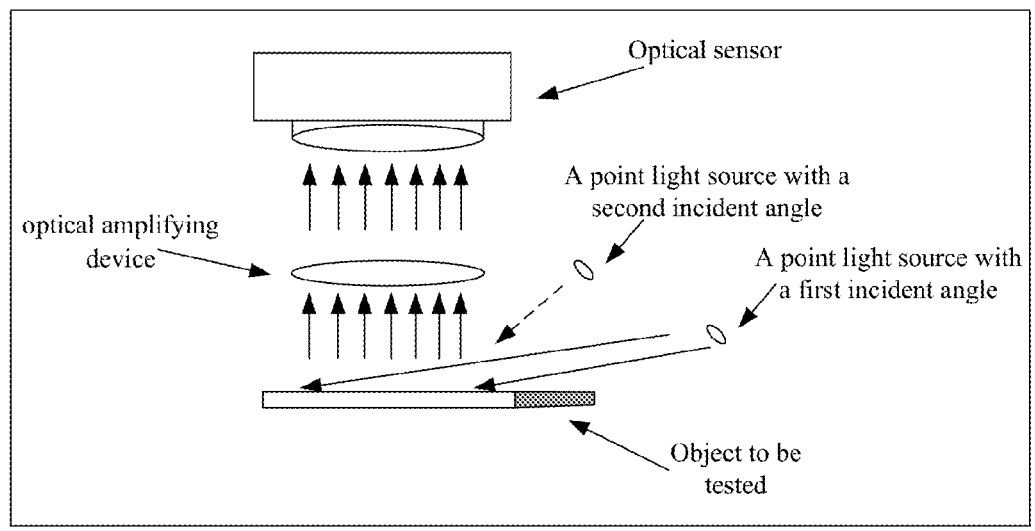
FIG. 6 is a flowchart of an anti-counterfeiting test method based on textures according to an embodiment of the present invention.

Exemplarily, FIG. 6 shows a particular process of an anti-counterfeiting test method based on textures if the pre-determined anti-counterfeiting test model is a light reflex anti-counterfeiting test model. In the figure, according to an embodiment of the present invention, a point light source with two incident angles is provided, namely a first incident angle and a second incident angle. As shown in the figure, the point light source may be provided in form of two fixed point light sources with different incident angles. In order to obtain clear textures of the test area, preferably, an optical amplifying device is provided above the test area and an optical sensor is provided above the optical amplifying device and configured to take pictures of the test area. Alternately, the optical amplifying device may be made as a part that is integrated with the optical sensor so that the anti-counterfeiting test system used for testing the object is simplified. When light emitted by the two fixed point light sources with different incident angles is projected on the test area, corresponding texture pictures can be obtained.

In step 304, texture characteristics of each of the texture pictures of the pre-determined test area corresponding to the different incident angles of the point light sources are acquired.

In step 305, a multi-dimensional texture characteristic of the pre-determined test area is reconstructed based on obtained texture characteristics of each of the texture pictures.

In this embodiment, a plurality of texture pictures corresponding to the different incident angles of the point light source can be obtained by the optical sensor, and then texture characteristics of each of the plurality of texture pictures can be abstracted and used to reconstruct a multi-dimensional texture characteristic. So that the printing counterfeit of the test area can be prevented, and the anti-counterfeiting effect of the test area can be improved.

Preferably, a light source with only two incident angles is provided wherein one of the two incident angles ranges from 0° to 5°, the other one ranges from 75° to 85°. Therefore, two texture pictures of the test area can be obtained, since the two texture incident angles within 90°, the multi-dimensional texture characteristic of the pre-determined test area is easily reconstructed, thus reconstruction efficiency of the multi-dimensional texture characteristic can be improved without reducing the anti-counterfeiting level and increasing the number of texture pictures to be processed.

In step S306, similarity between the multi-dimensional texture characteristic and pre-stored texture characteristics is computed and a test result is output based on the similarity.

In the embodiment of the present invention, the object is tested by means of light reflection, in particular, texture characteristics of the test area are obtained under different incident angles, and then a multi-dimensional texture characteristic is reconstructed based on the texture characteristics. Thus the printing counterfeit of the test area can be prevented, and the anti-counterfeiting effect of the test area can be improved.

To a skilled person in the art, it is noted that all or parts of the steps in the embodiment of the present invention may be performed by hardware controlled by relative programs wherein the programs may be stored in a readable storage medium of a computer, such as a ROM/RAM, a disk or a CD.

Figure 7:
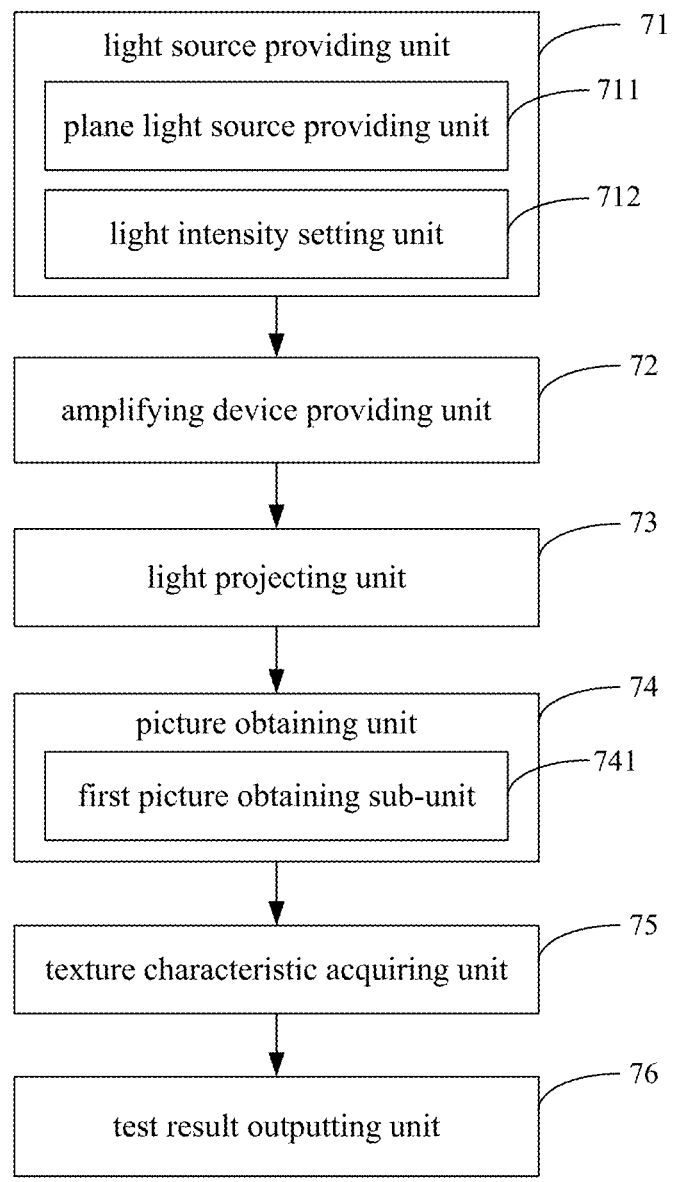
FIG. 7 is a structure chart of an anti-counterfeiting test device based on textures according to an embodiment of the present invention.

FIG. 7 illustrates a structure of an anti-counterfeiting test device based on textures according to an embodiment of the present invention. In order to easily describe, only parts related to the embodiment are illustrated, wherein:

a light source providing unit 71 is configured for providing a light source based on a pre-determined anti-counterfeiting test model wherein the pre-determined anti-counterfeiting test model is a light transmittance anti-counterfeiting test model or a light reflex anti-counterfeiting test model.

An amplifying device providing unit 72 is configured for providing an optical amplifying device between an optical sensor and the pre-determined test area in order to optically amplify the pre-determined test area based on magnification of the optical amplifying device.

a light projecting unit 73 is configured for projecting light emitted by the light source on a pre-determined test area of a object to be tested.

a picture obtaining unit 74 is configured for obtaining a pre-determined number of pictures of the pre-determined test area by means of a pre-determined optical sensor based on the pre-determined anti-counterfeiting test model.

a texture characteristic acquiring unit 75 is configured for acquiring texture characteristics of the pre-determined test area from the pictures; and a test result outputting unit 76 is configured for computing similarity between the texture characteristics acquired by the texture characteristic acquiring unit 75 and pre-stored texture characteristics and outputting a test result based on the similarity.

In particular, the light source providing unit 71 includes a plane light source providing unit 711 configured for providing a plane light source when the pre-determined anti-counterfeiting test model is the light transmittance anti-counterfeiting test model and a light intensity setting unit 712 configured for setting light intensity of the plane light source based on the transparency of the object.

In particular, the picture obtaining unit 74 includes a first picture obtaining sub-unit 741 configured for positioning the plane light source and the optical sensor oppositely to both sides of the pre-determined test area and obtaining a texture picture of the pre-determined test area by means of the optical sensor.

Figure 8:
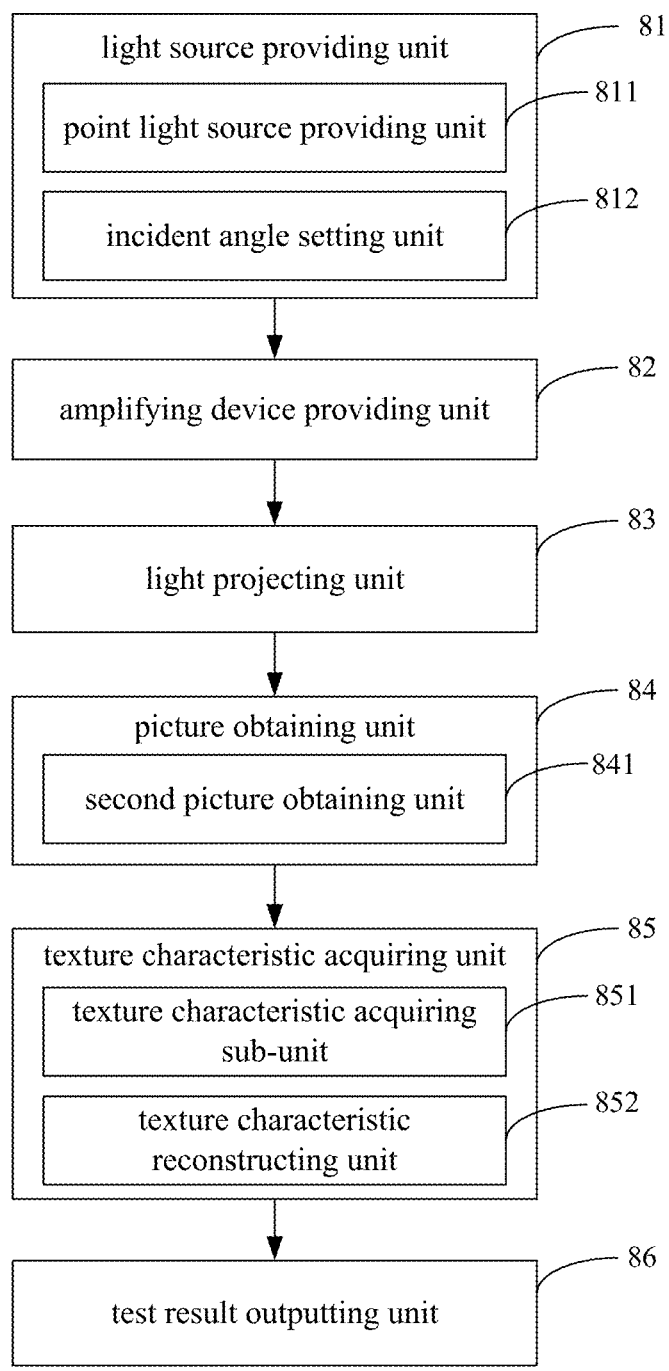
FIG. 8 is a structure chart of an anti-counterfeiting test device based on textures according to an embodiment of the present invention.

FIG. 8 illustrates a structure of an anti-counterfeiting test device based on textures according to an embodiment of the present invention. In order to easily describe, only parts related to the embodiment are illustrated, wherein:

a light source providing unit 81 is configured for providing a light source based on a pre-determined anti-counterfeiting test model, wherein the pre-determined anti-counterfeiting test model is a light transmittance anti-counterfeiting test model or a light reflex anti-counterfeiting test model.

An amplifying device providing unit 82 is configured for providing an optical amplifying device between the optical sensor and the pre-determined test area, in order to optically amplify the pre-determined test area based on magnification of the optical amplifying device.

a light projecting unit 83 is configured for projecting light of the light emitted by the light source on a pre-determined test area of the object.

a picture obtaining unit 84 is configured for obtaining a pre-determined number of pictures of the pre-determined test area by means of a pre-determined optical sensor based on the pre-determined anti-counterfeiting test model.

a texture characteristic acquiring unit 85 is configured for acquiring texture characteristics of the pre-determined test area from the pictures; and a test result outputting unit 86 is configured for computing similarity between the texture characteristics acquired by the texture characteristic acquiring unit 75 and pre-stored texture characteristics and outputting a test result based on the similarity.

In particular, the light source providing unit 81 includes a point light source providing unit 811 configured for providing a point light sources when the pre-determined anti-counterfeiting test model is the light reflex anti-counterfeiting test model and an incident angle setting unit 812 configured for setting different incident angles of the point light sources based on a pre-determined anti-counterfeiting level.

In particular, the picture obtaining unit 84 includes a second picture obtaining unit 841 configured for obtaining the texture pictures of the pre-determined test area corresponding to the different incident angles of the point light source by means of the optical sensor in order to get a plurality of texture pictures corresponding to the pre-determined test area under the different incident angles of the point light source wherein the optical sensor and the point light source are positioned on the same side of the pre-determined test area.

In particular, the texture characteristic acquiring unit 85 includes a texture characteristic acquiring sub-unit 851 configured for acquiring texture characteristics of each of the texture pictures of the pre-determined test area corresponding to the different incident angles of the point light sources and a texture characteristic reconstructing unit 852 configured for reconstructing a multi-dimensional texture characteristic of the pre-determined test area based on obtained texture characteristics of each of the texture pictures.

Figure 9:
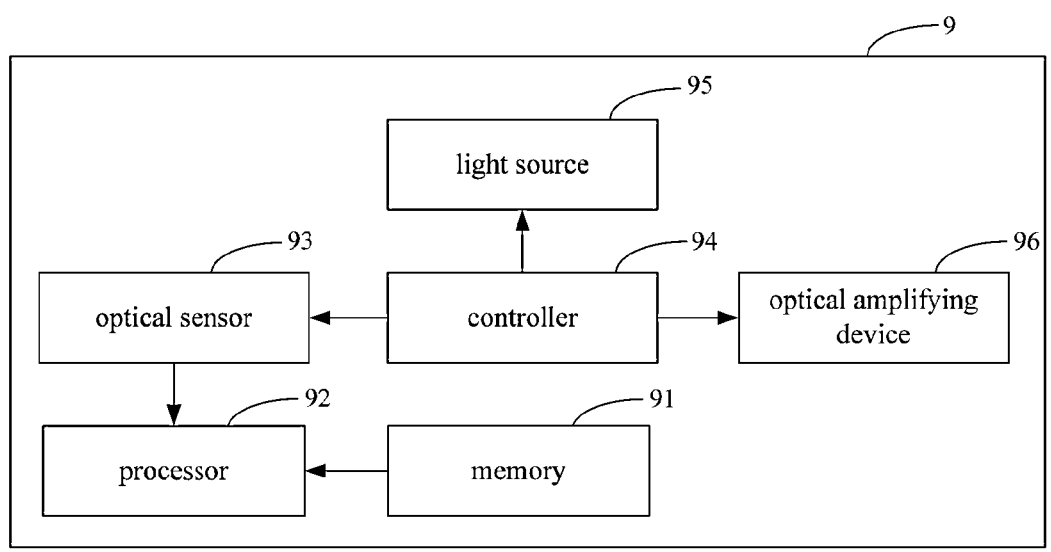
FIG. 9 is a structure chart of an anti-counterfeiting test system based on textures according to an embodiment of the present invention.

FIG. 9 illustrates a structure of an anti-counterfeiting test system 9 based on textures according to an embodiment of the present invention. In order to easily describe, only parts related to the embodiment are illustrated.

As shown in the figure, the anti-counterfeiting test system 9 includes a light source 95 configured for projecting light on a object to be tested, a memory 91 configured for storing the texture characteristics of the object, a controller 94 configured for controlling the light source 95 to provide a type of light source based on a pre-determined anti-counterfeiting test model and controlling the light source 95 to project light on a pre-determined test area of the object wherein pre-determined anti-counterfeiting test model is a light transmittance anti-counterfeiting test model or a light reflex anti-counterfeiting test model, an optical sensor 93 configured for obtaining a pre-determined number of pictures of the pre-determined test area based on the pre-determined anti-counterfeiting test model and a processor 92 configured for acquiring texture characteristics of the pre-determined test area from the pictures obtained by the optical sensor, computing similarity between acquired texture characteristics and the texture characteristics stored in the memory, and outputting a test result based on the similarity.

In particular, the controller 94 is configured for controlling the light source to provide a plane light source when the pre-determined anti-counterfeiting test model is the light transmittance anti-counterfeiting test model, setting light intensity of the plane light source based on the transparency of the object, positioning the plane light source and the optical sensor to both sides of the pre-determined test area and obtaining a texture picture of the pre-determined test area by means of the optical sensor.

In particular, the controller 94 is configured for controlling the light source to provide a point light sources when the pre-determined anti-counterfeiting test model is the light reflex anti-counterfeiting test model, setting different incident angles of the point light sources based on a pre-determined anti-counterfeiting level, controlling the optical sensor to obtain the texture pictures of the pre-determined test area corresponding to the different incident angles of the point light sources by means of the optical sensor, in order to get a plurality of texture pictures corresponding to the pre-determined test area under the different incident angles of the point light sources wherein the optical sensor and the point light sources are positioned on the same side of the pre-determined test area. The processor 92 is further configured for acquiring texture characteristics of each of the texture pictures of the pre-determined test area corresponding to the different incident angles of the point light source and reconstructing a multi-dimensional texture characteristic of the pre-determined test area based on obtained texture characteristics of each of the texture pictures.

In particular, the processor 92 and the controller 94 may be integrated in a central processing unit.

Preferably, the system 9 further includes an optical amplifying device 96 positioned between the optical sensor and the pre-determined test area in order to optically amplify the pre-determined test area based on magnification of the optical amplifying device. In particular, the magnification may be set based on transparency of the object so that the magnification can be controlled flexibly to accommodate objects with different transparency.

In the embodiments of the present invention, the object to be tested is transmitted by uniform light and the clear texture characteristics of the test area then are acquired wherein the texture characteristics are the characteristics of the textures formed by overlaying the inner textures of the object with the external textures of the object within the test area. So that composite texture characteristics of the object itself are configured as anti-counterfeiting characteristics, and the anti-counterfeiting effect is improved greatly. When light emitted by the point light source is projected on the object, clear texture characteristics corresponding to different incident angles are obtained and configured to reconstruct a multi-dimensional texture characteristic, thereby preventing the printing counterfeit of the test area, the anti-counterfeiting effect is further improved.

The present invention has been further detailed in the above descriptions with reference to the preferred embodiments; however, it shall not be construed that implementations of the present invention are only limited to these descriptions.

Many simple deductions or replacements may further be made by those of ordinary skill in the art without departing from the conception of the present invention, and all of the deductions or replacements shall be considered to be covered within the protection scope of the present invention.

The invention claimed is:

1. An anti-counterfeiting test method based on textures, comprising:
    providing a light source based on a pre-determined anti-counterfeiting test model wherein the pre-determined anti-counterfeiting test model is a light transmittance anti-counterfeiting test model or a light reflex anti-counterfeiting test model;
    projecting light emitted by the light source on a pre-determined test area of an object to be tested;
    obtaining a pre-determined number of pictures of the pre-determined test area by means of a pre-determined optical sensor based on the pre-determined anti-counterfeiting test model; and
    acquiring texture characteristics of the pre-determined test area from the pictures; and
    computing similarity between the texture characteristics and pre-stored texture characteristics and outputting a test result based on the similarity,
    wherein the providing step comprises:
    providing a plane light source if the pre-determined anti-counterfeiting test model is the light transmittance anti-counterfeiting test model; and
    setting light intensity of the plane light source based on transparency of the object.

2. The anti-counterfeiting test method of claim 1, wherein before the obtaining step, the anti-counterfeiting method further comprises:
    providing an optical amplifying device between the optical sensor and the pre-determined test area in order to optically amplify the pre-determined test area based on a magnification of the optical amplifying device.

3. The anti-counterfeiting test method of claim 2, wherein the magnification of the optical amplifying device is two.

4. The anti-counterfeiting test method of claim 1, wherein the obtaining step comprises:
    positioning the plane light source and the optical sensor oppositely to both sides of the pre-determined test area and obtaining a texture picture of the pre-determined test area by means of the optical sensor.

5. An anti-counterfeiting test method of based on textures, comprising:
providing a light source based on a pre-determined anti-counterfeiting test model wherein the pre-determined anti-counterfeiting test model is a light transmittance anti-counterfeiting test model or a light reflex anti-counterfeiting test model;
projecting light emitted by the light source on a pre-determined test area of an object to be tested;
obtaining a pre-determined number of pictures of the pre-determined test area by means of a pre-determined optical sensor based on the pre-determined anti-counterfeiting test model;
acquiring texture characteristics of the pre-determined test area from the pictures; and
computing similarity between the texture characteristics and pre-stored texture characteristics and outputting a test result based on the similarity,
wherein the providing step comprises:
providing a point light sources if the pre-determined anti-counterfeiting test model is the light reflex anti-counterfeiting test model; and
setting different incident angles of the point light source based on a pre-determined anti-counterfeiting level.

6. The anti-counterfeiting test method of claim 5, wherein the obtaining step comprises:
obtaining the texture pictures of the pre-determined test area corresponding to the different incident angles of the point light source by means of the optical sensor in order to get a plurality of texture pictures corresponding to the pre-determined test area under the different incident angles of the point light source wherein the optical sensor and the point light sources are positioned on the same side of the pre-determined test area.

7. The anti-counterfeiting test method of claim 6, wherein the acquiring step comprises:
acquiring texture characteristics of each of the texture pictures of the pre-determined test area corresponding to the different incident angles of the point light source;
reconstructing a multi-dimensional texture characteristic of the pre-determined test area based on obtained texture characteristics of each of the texture pictures.

8. The anti-counterfeiting test method of claim 6, wherein the incident angles of the point light source range from 0° to 5° or from 75° to 85°.

9. An anti-counterfeiting test device based on textures, comprising:
a light source providing unit configured for providing a light source based on a pre-determined anti-counterfeiting test model wherein the pre-determined anti-counterfeiting test model is a light transmittance anti-counterfeiting test model or a light reflex anti-counterfeiting test model;
a light projecting unit configured for projecting light emitted by the light source on a pre-determined test area of an object to be tested;
a picture obtaining unit configured for obtaining a pre-determined number of pictures of the pre-determined test area by means of a pre-determined optical sensor based on the pre-determined anti-counterfeiting test model;
a texture characteristic acquiring unit configured for acquiring texture characteristics of the pre-determined test area from the pictures; and
a test result outputting unit configured for computing similarity between the texture characteristics and pre-stored texture characteristics and outputting a test result based on the similarity,
wherein the light source providing unit comprises:
a plane light source providing unit configured for providing a plane light source if the pre-determined anti-counterfeiting test model is the light transmittance anti-counterfeiting test model; and
a light intensity setting unit configured for setting light intensity of the plane light source based on transparency of the object.

10. The anti-counterfeiting test device of claim 9, wherein the anti-counterfeiting device further comprises:
an amplifying device providing unit configured for providing an optical amplifying device between the optical sensor and the pre-determined test area in order to optically amplify the pre-determined test area based on magnification of the optical amplifying device.

11. The anti-counterfeiting test device of claim 9, wherein the picture obtaining unit comprises:
a first picture obtaining sub-unit configured for positioning the plane light source and the optical sensor oppositely to both sides of the pre-determined test area and obtaining a texture picture of the pre-determined test area by means of the optical sensor.

12. An anti-counterfeiting test device based on textures, comprising:
a light source providing unit configured for providing a light source based on a pre-determined anti-counterfeiting test model wherein the pre-determined anti-counterfeiting test model is a light transmittance anti-counterfeiting test model or a light reflex anti-counterfeiting test model;
a light projecting unit configured for projecting light emitted by the light source on a pre-determined test area of an object to be tested;
a picture obtaining unit configured for obtaining a pre-determined number of pictures of the pre-determined test area by means of a pre-determined optical sensor based on the pre-determined anti-counterfeiting test model;
a texture characteristic acquiring unit configured for acquiring texture characteristics of the pre-determined test area from the pictures; and
a test result outputting unit configured for computing similarity between the texture characteristics and pre-stored texture characteristics and outputting a test result based on the similarity,
wherein the light source providing unit comprises:
a point light source providing unit configured for providing a point light source if the pre-determined anti-counterfeiting test model is the light reflex anti-counterfeiting test model; and
an incident angle setting unit configured for setting different incident angles of the point light source based on a pre-determined anti-counterfeiting level.

13. The anti-counterfeiting test device of claim 12, wherein the picture obtaining unit comprises:
a second picture obtaining unit configured for obtaining the texture pictures of the pre-determined test area corresponding to the different incident angles of the point light source by means of the optical sensor in order to get a plurality of texture pictures corresponding to the pre-determined test area under the different incident angles of the point light source wherein the optical sensor and the point light source are positioned on the same side of the pre-determined test area.

14. The anti-counterfeiting test device of claim 13, wherein the texture characteristic acquiring unit comprises:
   a texture characteristic acquiring sub-unit configured for acquiring texture characteristics of each of the texture pictures of the pre-determined test area corresponding to the different incident angles of the point light source; and
   a texture characteristic reconstructing unit configured for reconstructing a multi-dimensional texture characteristic of the pre-determined test area based on obtained texture characteristics of each of the texture pictures.

15. An anti-counterfeiting test system based on textures, comprising:
   a light source configured for projecting light on a object to be tested;
   a memory configured for storing the texture characteristics of the object; a controller configured for controlling the light source to provide a type of light source based on a pre-determined anti-counterfeiting test model and controlling the type of light source to project light on a pre-determined test area of the object wherein the pre-determined anti-counterfeiting test model is a light transmittance anti-counterfeiting test model or a light reflex anti-counterfeiting test model;
   an optical sensor configured for obtaining a pre-determined number of pictures of the pre-determined test area based on the pre-determined anti-counterfeiting test model; and
   a processor configured for acquiring texture characteristics of the pre-determined test area from the pictures obtained by the optical sensor, computing similarity between acquired texture characteristics and the texture characteristics stored in the memory, and outputting a test result based on the similarity,
   wherein the anti-counterfeiting test system further comprising:
   an optical amplifying device positioned between the optical sensor and the pre-determined test area in order to optically amplify the pre-determined test area based on magnification of the optical amplifying device, and
   wherein the controller is further configured for controlling the light source to provide a plane light source if the pre-determined anti-counterfeiting test model is the light transmittance anti-counterfeiting test model, setting light intensity of the plane light source based on transparency of the object, positioning the plane light source and the optical sensor oppositely to both sides of the pre-determined test area and obtaining a texture picture of the pre-determined test area by means of the optical sensor.

16. An anti-counterfeiting test system based on textures, comprising:
   a light source configured for projecting light on a object to be tested;
   a memory configured for storing the texture characteristics of the object;
   a controller configured for controlling the light source to provide a type of light source based on a pre-determined anti-counterfeiting test model and controlling the type of light source to project light on a pre-determined test area of the object wherein the pre-determined anti-counterfeiting test model is a light transmittance anti-counterfeiting test model or a light reflex anti-counterfeiting test model;
   an optical sensor configured for obtaining a pre-determined number of pictures of the pre-determined test area based on the pre-determined anti-counterfeiting test model; and
   a processor configured for acquiring texture characteristics of the pre-determined test area from the pictures obtained by the optical sensor, computing similarity between acquired texture characteristics and the texture characteristics stored in the memory, and outputting a test result based on the similarity,
   wherein the anti-counterfeiting test system further comprising:
   an optical amplifying device between the optical sensor and the pre-determined test area in order to optically amplify the pre-determined test area based on magnification of the optical amplifying device, and
   wherein the controller is further configured for controlling the light source to provide a point light sources if the pre-determined anti-counterfeiting test model is the light reflex anti-counterfeiting test model, setting different incident angles of the point light source based on a pre-determined anti-counterfeiting level, controlling the optical sensor to obtain the texture pictures of the pre-determined test area corresponding to the different incident angles of the point light source by means of the optical sensor, in order to get a plurality of texture pictures corresponding to the pre-determined test area under the different incident angles of the point light source wherein the optical sensor and the point light source are positioned on the same side of the pre-determined test area.

* * * * *